US012044065B2

(12) United States Patent
Staton et al.

(10) Patent No.: US 12,044,065 B2
(45) Date of Patent: Jul. 23, 2024

(54) WINDOW SYSTEMS AND COMPONENTS

(71) Applicant: Newtonoid Technologies, L.L.C., Liberty, MO (US)

(72) Inventors: Fielding B. Staton, Liberty, MO (US); David Strumpf, Columbia, MO (US)

(73) Assignee: Newtonoid Technologies, L.L.C., Liberty, MO (US)

( * ) Notice: Subject to any disclaimer, the term of this patent is extended or adjusted under 35 U.S.C. 154(b) by 0 days.

(21) Appl. No.: 18/317,774

(22) Filed: May 15, 2023

(65) Prior Publication Data

US 2024/0060358 A1 Feb. 22, 2024

Related U.S. Application Data

(62) Division of application No. 16/830,030, filed on Mar. 25, 2020, now Pat. No. 11,668,133.

(60) Provisional application No. 62/823,205, filed on Mar. 25, 2019.

(51) Int. Cl.

| | |
|---|---|
| ***E06B 7/28*** | (2006.01) |
| ***E06B 3/263*** | (2006.01) |
| *E05D 15/22* | (2006.01) |
| *E06B 5/00* | (2006.01) |
| *E06B 9/24* | (2006.01) |

(52) U.S. Cl.

CPC .............. *E06B 7/28* (2013.01); *E06B 3/2632* (2013.01); *E05D 15/22* (2013.01); *E06B 5/00* (2013.01); *E06B 2009/2476* (2013.01)

(58) Field of Classification Search

CPC . E06B 7/28; E06B 3/2632; E06B 5/00; E06B 2009/2476; E05D 15/22

See application file for complete search history.

(56) References Cited

U.S. PATENT DOCUMENTS

| | | | |
|---|---|---|---|
| 524,250 A | 8/1894 | Hodgekins |
| 11,668,133 B1 | 6/2023 | Staton et al. |
| 2008/0229664 A1 | 9/2008 | Dallas et al. |
| 2013/0278989 A1 | 10/2013 | Lam et al. |

OTHER PUBLICATIONS

"WA-designed clear glass solar windowsgear up for production", Sophie Vorrath, [online], [retrieved on Dec. 6, 2023]. Retrieved from the Internet :<URL: https://reneweconomy.com.au/wa-designed-clear-glass-solar-windows-gear-production-52522/>, pp. 1-7. (Year: 2018).*

Vasiliev et al., "Spectrally-Selective Energy-Harvesting Solar Windows for Public Infrastructure Applications", Appl. Sci. 2018, 8, 849. (Year: 2018).*

Nguyen et al., "Design, Simulate and Build a Photovoltaic-based Energy System for Mobile Device Chargers", Universal Journal of Electrical and Electronic Engineering 3(2): 64-70, 2015 (Year: 2015).*

(Continued)

*Primary Examiner* — Tae-Sik Kang

(74) *Attorney, Agent, or Firm* — AVEK IP, LLC

(57) ABSTRACT

A window system includes a window frame; a transparent window pane; an energy harvesting device coupled to the window frame or the transparent window frame; an output device that uses or transmits electricity; and a battery housed in the window frame, the battery being in electrical communication with the energy harvesting device and the output device.

20 Claims, 13 Drawing Sheets

(56) References Cited

OTHER PUBLICATIONS

"Advantageous Transit Shelters", Amelia Roblin, [online], [retrieved on Dec. 6, 2023]. Retrieved from the Internet :<URL: https://www.trendhunter.com/trends/solar-stop>, pp. 1-5. (Year: 2011).*

* cited by examiner

WINDOW SYSTEMS AND COMPONENTS

CROSS-REFERENCE TO RELATED APPLICATIONS

This application is a divisional of U.S. application Ser. No. 16/830,030, filed Mar. 25, 2020, which is pending and which claims priority to U.S. Provisional Patent Application No. 62/823,205, filed Mar. 25, 2019, the entire disclosure of each of which is incorporated herein by reference in its entirety.

SUMMARY

The following presents a simplified summary of the invention in order to provide a basic understanding of some aspects of the invention. The summary is not an extensive overview of the invention. It is not intended to identify critical elements of the invention or to delineate the scope of the invention. Its sole purpose is to present some aspects of the invention in a simplified form as a prelude to the more detailed description that is presented elsewhere herein.

According to one embodiment, a window system includes a moveable sash having a display; and a power distribution network for providing power to the display. The power distribution network has a window sash balance that forms part of an electric circuit for passing electricity from a power source to the moveable sash.

According to another embodiment, a power distribution network for a window having a moveable sash includes a window sash balance that passes electricity therethrough. The window sash balance has a fixed end and a moveable end, the fixed end being in electrical contact with a power source.

According to still another embodiment, a window system includes a window frame; a transparent window pane; an energy harvesting device coupled to the window frame or the transparent window frame; an output device that uses or transmits electricity; and a battery housed in the window frame, the battery being in electrical communication with the energy harvesting device and the output device.

DETAILED DESCRIPTION

A window system 1000 according to an embodiment of the current invention includes a power distribution network 1100 and a display 1200. The window system 1000 is configured as a window 1000*a* for a commercial, residential, or other building (though numerous other configurations are encompassed by the current disclosure), and the power distribution network 1100 provides electricity to the display 1200. External energy connections to the power distribution network 1100 may consist of any propagation method that allows transfer of power or storage of power to or from the power distribution network 1100 (e.g. USB, Power over Ethernet (POE), DC voltage, AC voltage, inductive coupling, capacitive coupling, direct contact, non-contact, photonic resonance, LED, laser, vibrational resonance, seismic, sound, noise, photovoltaic, piezoelectric, electromagnetic, current carrier, radio frequency, et cetera). The window 1000*a* in the embodiment 1000 is a single or double hung window having a frame 1010, a moveable sash 1020, and a fixed or moveable sash 1030, and the display 1200 is contained in the moveable sash 1020. The window system 1000 may additionally contain energy storage layers and modules for localized functions such as the display 1200 as well as energy storage for managed transfer to and from the power distribution network 1100.

Figure 1:
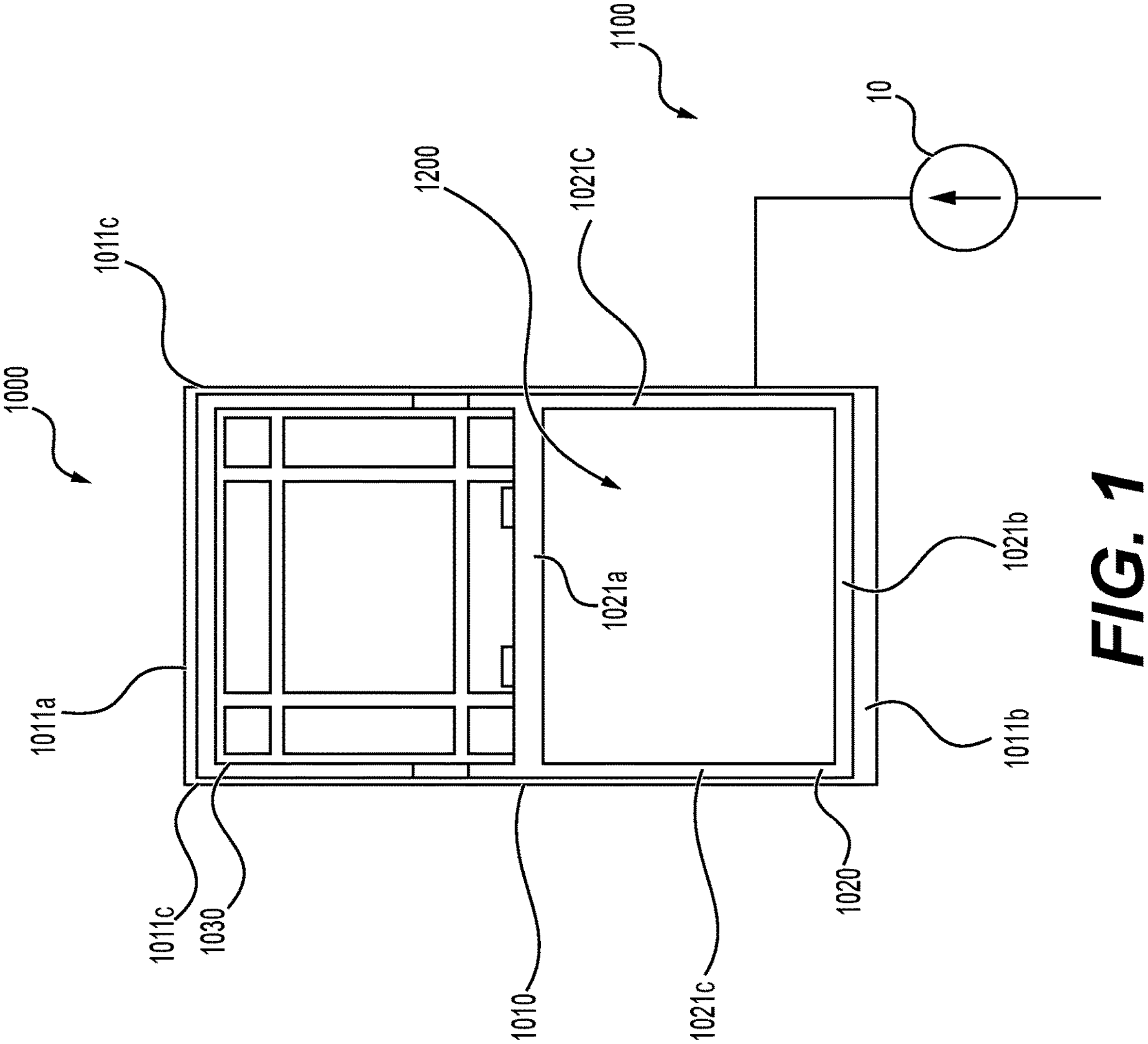
FIG. 1 is a front view of a window system according to an embodiment of the current invention.
Figure 2:
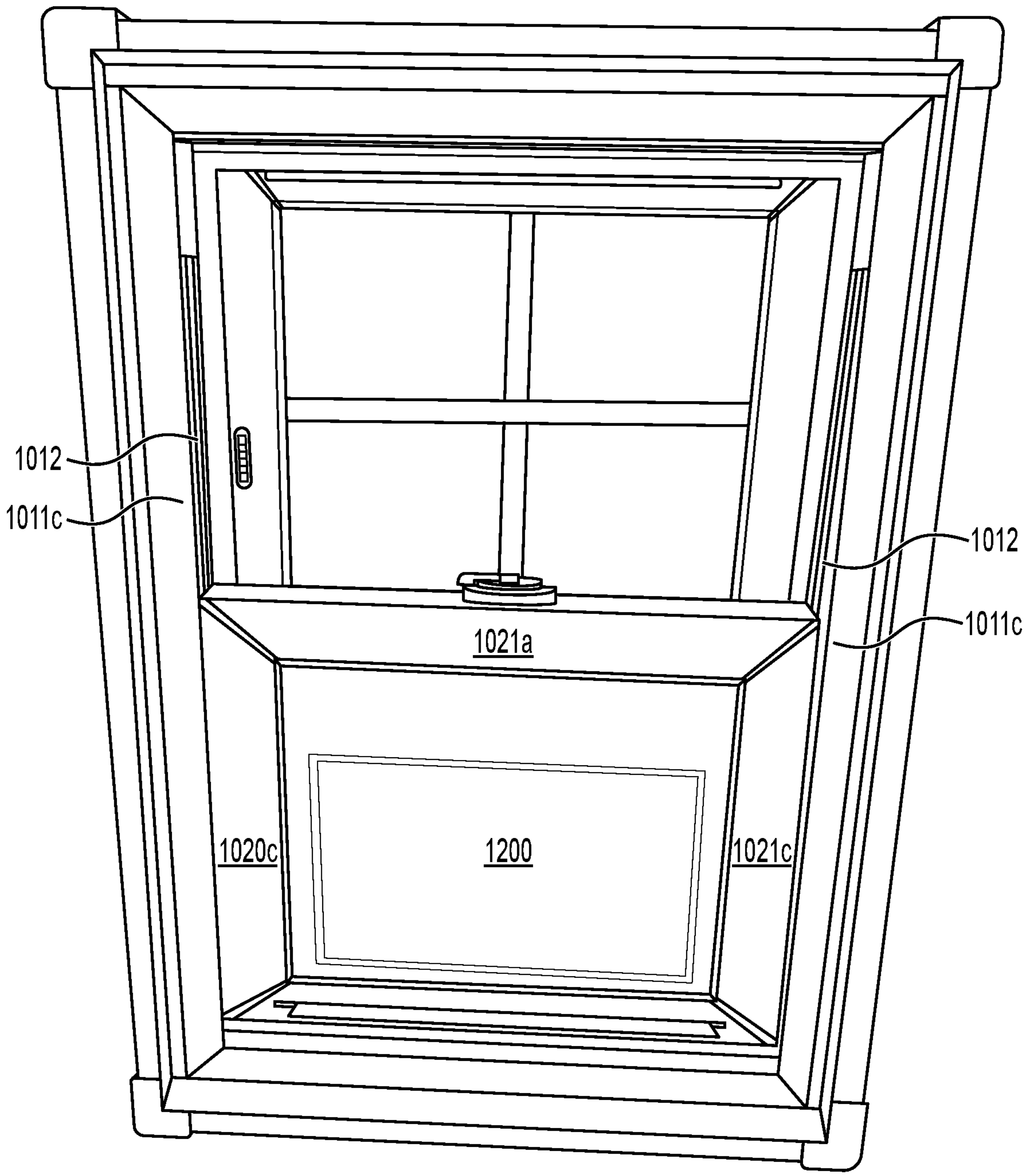
FIG. 2 is another front view of the window system of FIG. 1.
Figure 3:
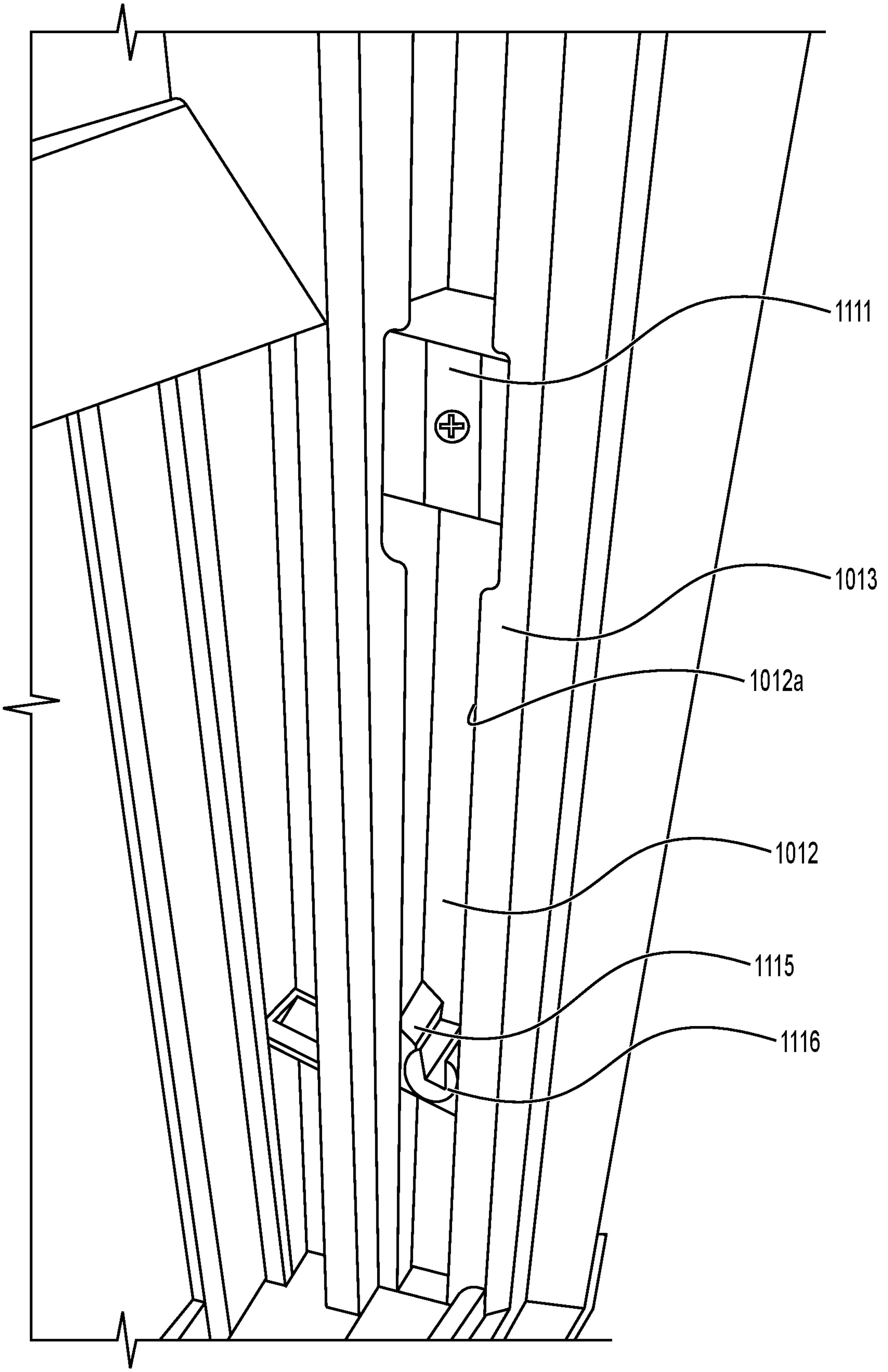
FIG. 3 is a perspective view of part of the window system of FIG. 1.

As is common with window frames and moveable sashes, the frame 1010 has a top (or "head") 1011*a*, a bottom (or "sill") 1011*b*, and a pair of opposed sides (or "jambs") 1011*c*, and the moveable sash 1020 has a top rail 1021*a*, a bottom rail 1021*b*, and a pair of opposed sides (or "stiles") 1021*c*. Also common, each jamb 1011*c* has a channel 1012 (FIGS. 2 and 3) along which the sash 1020 is able to travel.

Figure 4:
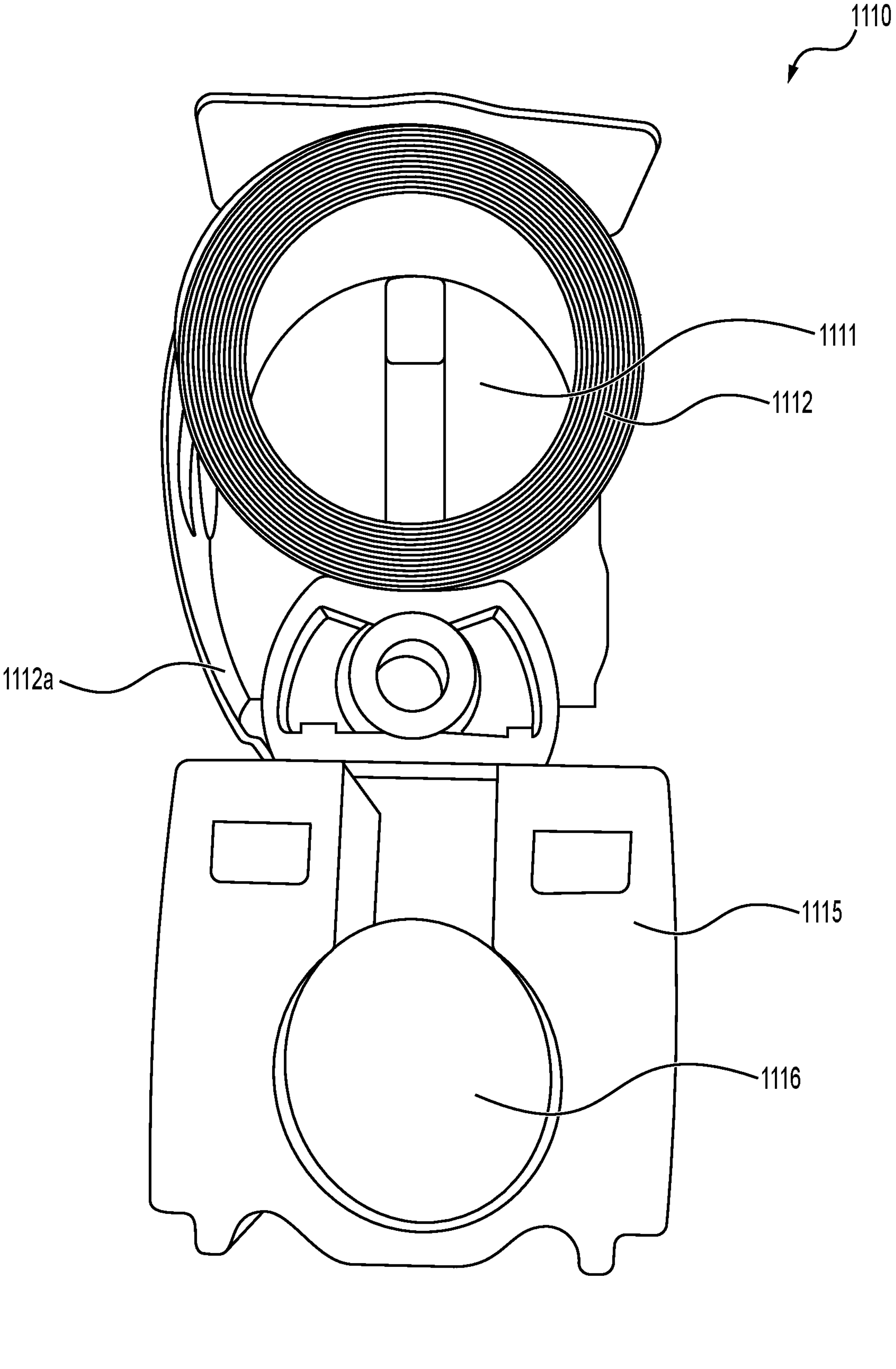
FIG. 4 is a rear view of a coil balance from the window system of FIG. 1.
Figure 5:
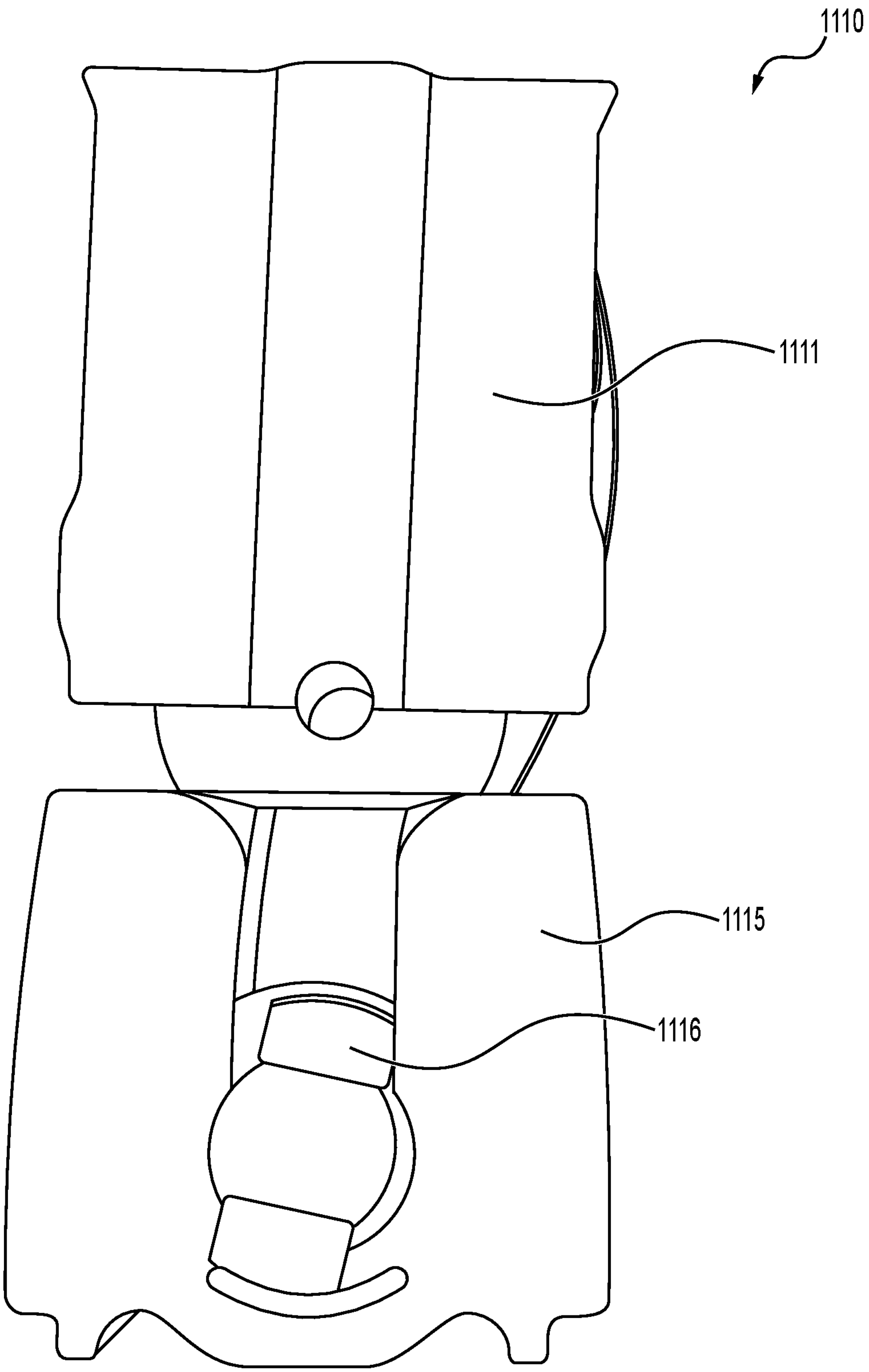
FIG. 5 is a front view of the coil balance of FIG. 4.
Figure 6:
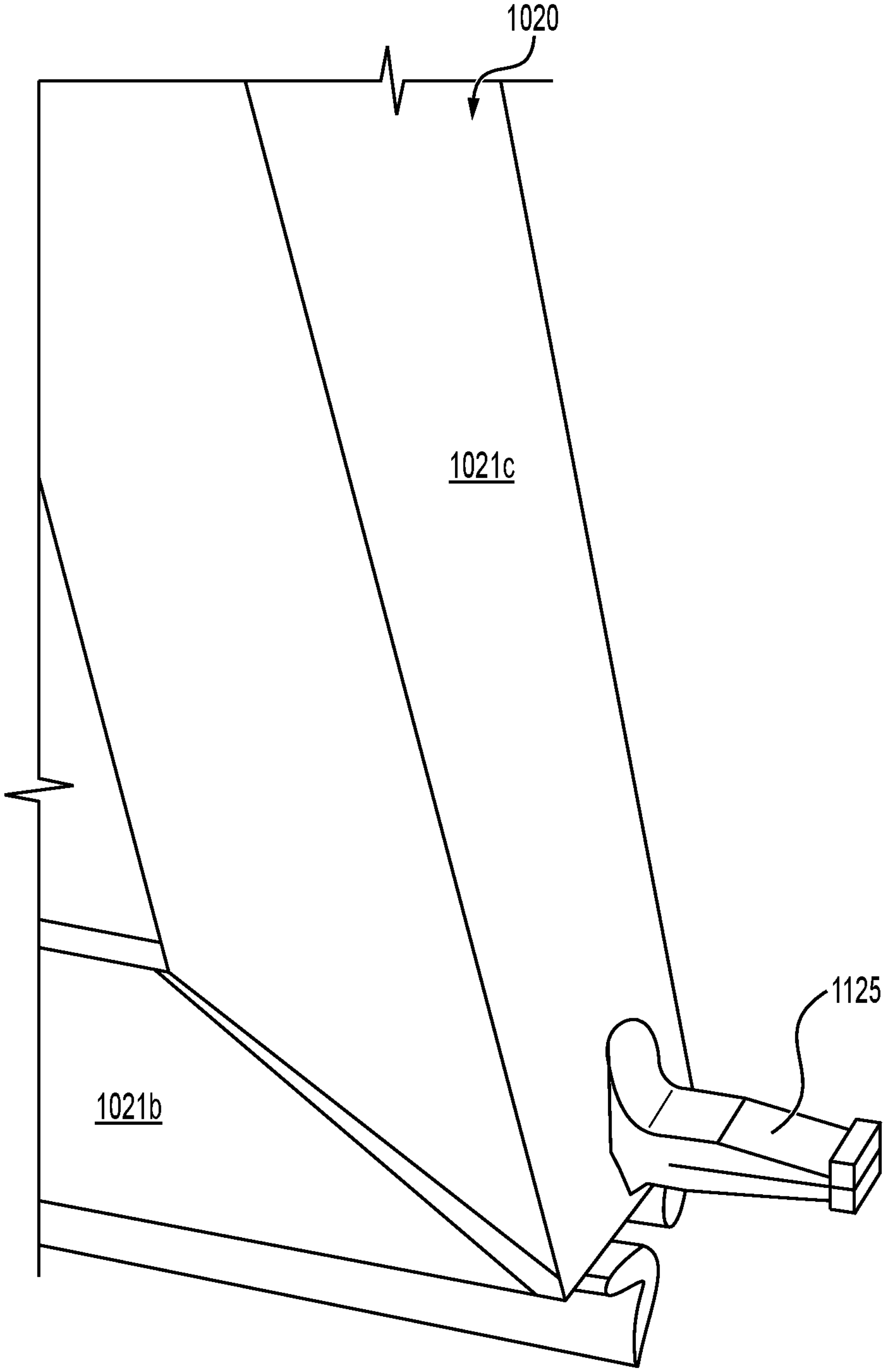
FIG. 6 is a perspective view of another part of the window system of FIG. 1.

In the window 1000*a*, each of the channels 1012 has a recessed area 1012*a* that is at least partially shielded by a flange 1013, and a coil balance 1110 (FIGS. 3 through 5) is positioned in each channel 1012. The coil balances 1110 help offset the weight of the movable sash 1020 as the movable sash 1020 is raised and lowered, and help the movable sash 1020 remain in desired positions (instead of falling due to gravity). The coil balances 1110 are also part of the power distribution network 1100. Each coil balance 1110 has a fixed portion 1111 attached to a respective jamb 1011*c*, and a movable portion 1115 configured to attach to the movable sash 1020. For example, the movable portion 1115 may include a receiving member (or "shoe") 1116 for permanently or selectively receiving a post 1125 (FIG. 6) extending from the movable sash 1020. The fixed portion 1111 is shown to include a coil 1112 in FIG. 4 and an end 1112*a* of the coil 1112 is shown coupled to the movable portion 1115, though in other embodiments the movable portion 1115 may include the coil 1112 and the end 1112*a* may attach to or form the fixed portion 1111. As the movable portion 1115 moves in the channel 1012 relative to the fixed portion 1111, the coil 1112 unwinds and extends along the recessed area 1012*a*. The coil 1112 is constructed of conductive material (e.g., metal or metallic coated), or includes conductive material such that electricity may be passed from the fixed portion 1111 to the movable portion 1115. In some embodiments, it may be desirable for the coil 1112 to have an inner layer constructed partially or entirely of metal and an outer layer constructed of an insulating material encasing the inner layer.

Figure 7:
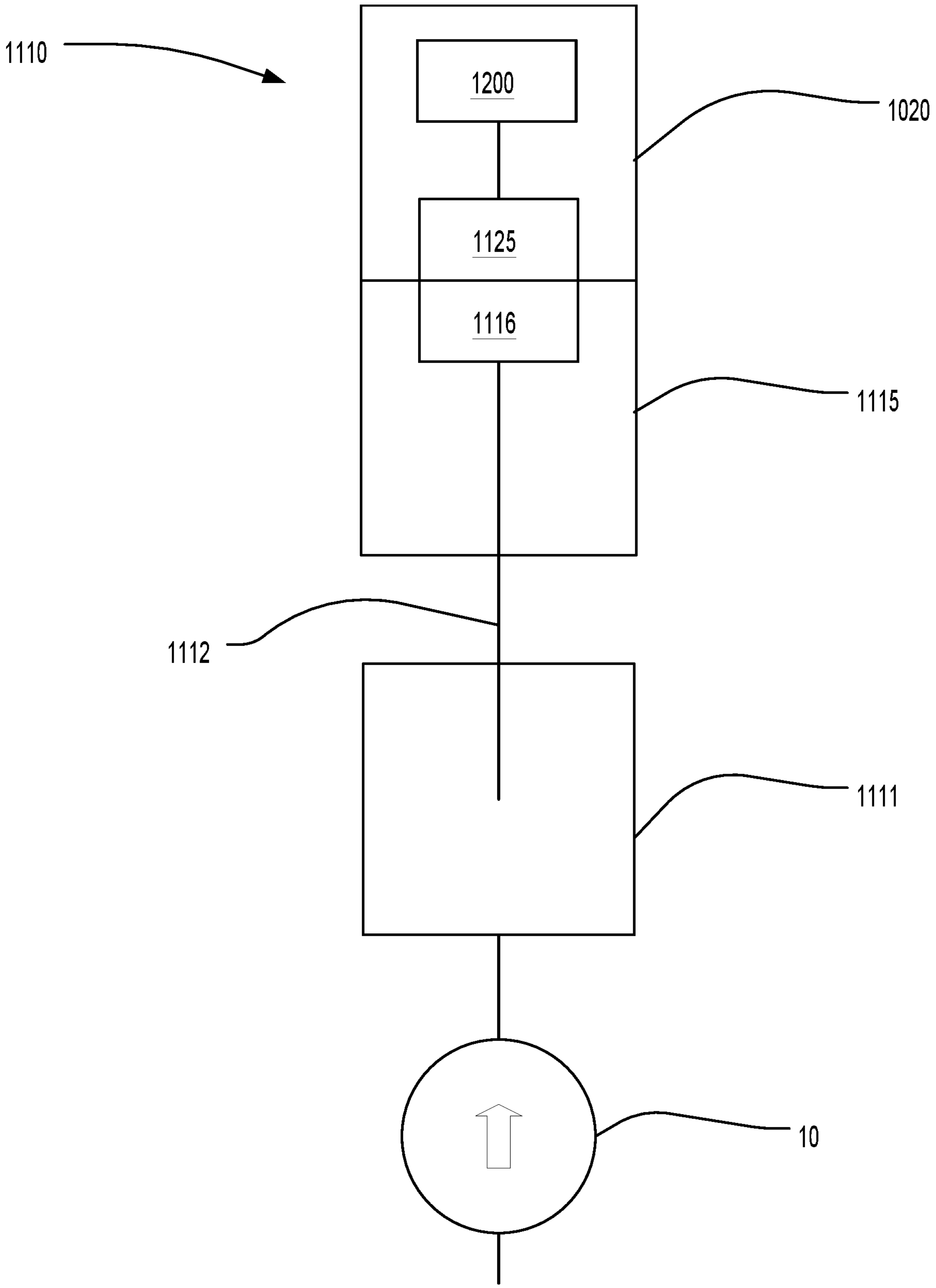
FIG. 7 schematically illustrates a power distribution network for use in the window system of FIG. 1.

The fixed portion 1111 is coupled to a power source 10 (e.g., a building's electrical wiring, a battery, a solar panel, or any other appropriate power source), and electricity may thus flow from the power source to the fixed portion 1111 and through the coil 1112 to the movable portion 1115. The coil end 1112*a* is in electrical communication with the receiving member 1116 through any appropriate arrangement, such as through direct connection or wiring, an electrical rotary joint connector, et cetera. In turn, the post 1125 may be constructed of or include metal or another conductive material, and seating the post 1125 in the receiving member 1116 may thus allow electricity to be passed from the movable portion 1115 to the movable sash 1020—regardless of the location of the movable sash 1020 along the channels 1012. This is shown schematically in FIG. 7.

Figure 8:
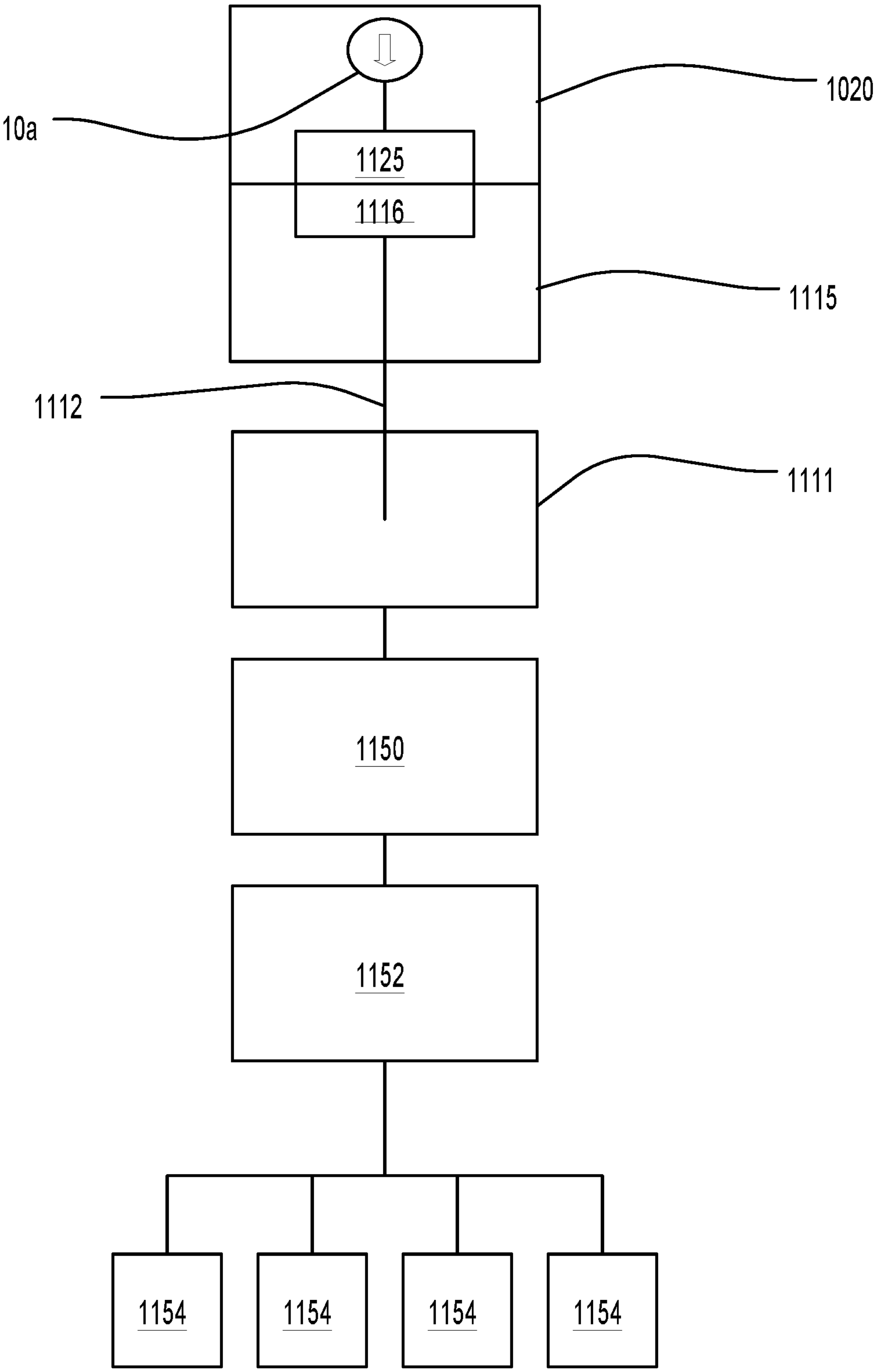
FIG. 8 schematically illustrates an alternate power distribution network for use in the window system of FIG. 1.

Moreover, as those skilled in the art will appreciate, the power distribution network 1110 may also act in reverse, allowing electricity to be passed from the movable sash 1020 (e.g., originating from a solar panel 10*a* on the movable sash 1020 or harvested using other transducing and conversion technologies 10*a*, such as those involving sound, light, vibration, magnetics, silicon grid arrays, carbon nanotubes, graphene, perovskite, integrated circuits, micro-electromechanical (MEMS) circuits, et cetera), through the post 1125, to the receiving member 1116, along the coil 1112, and to the building's electrical wiring, a battery, an electrical outlet, an electrical device, or any other appropriate destination. FIG. 8 illustrates such a situation, and provides a battery 1150 housed in the window frame 1010, an electrical outlet 1152 coupled to the sash 1020 or the window frame 1010, and a network of outlets 1154 remote from (i.e., not physically on) the window frame 1010.

In other embodiments, it may be sufficient for the power distribution network 1100 to be generally contained in the window 1000*a*, which may be a fixed window, a single hung window, a double hung window, et cetera. In such embodiments, the key features of the power distribution network 1100 may include the harvesting/transducing device 10*a* and the battery 1150 housed in the window frame 1010, with the battery 1150 being electrically coupled to at least one output device that uses or transmits electricity (e.g., the display 1200 or the electrical outlet 1152 coupled to the window 1000*a*). These embodiments may be particularly desirable in some instances because the window 1000*a* can be fully self-contained and need not interact with a building's primary power distribution network.

Figure 9:
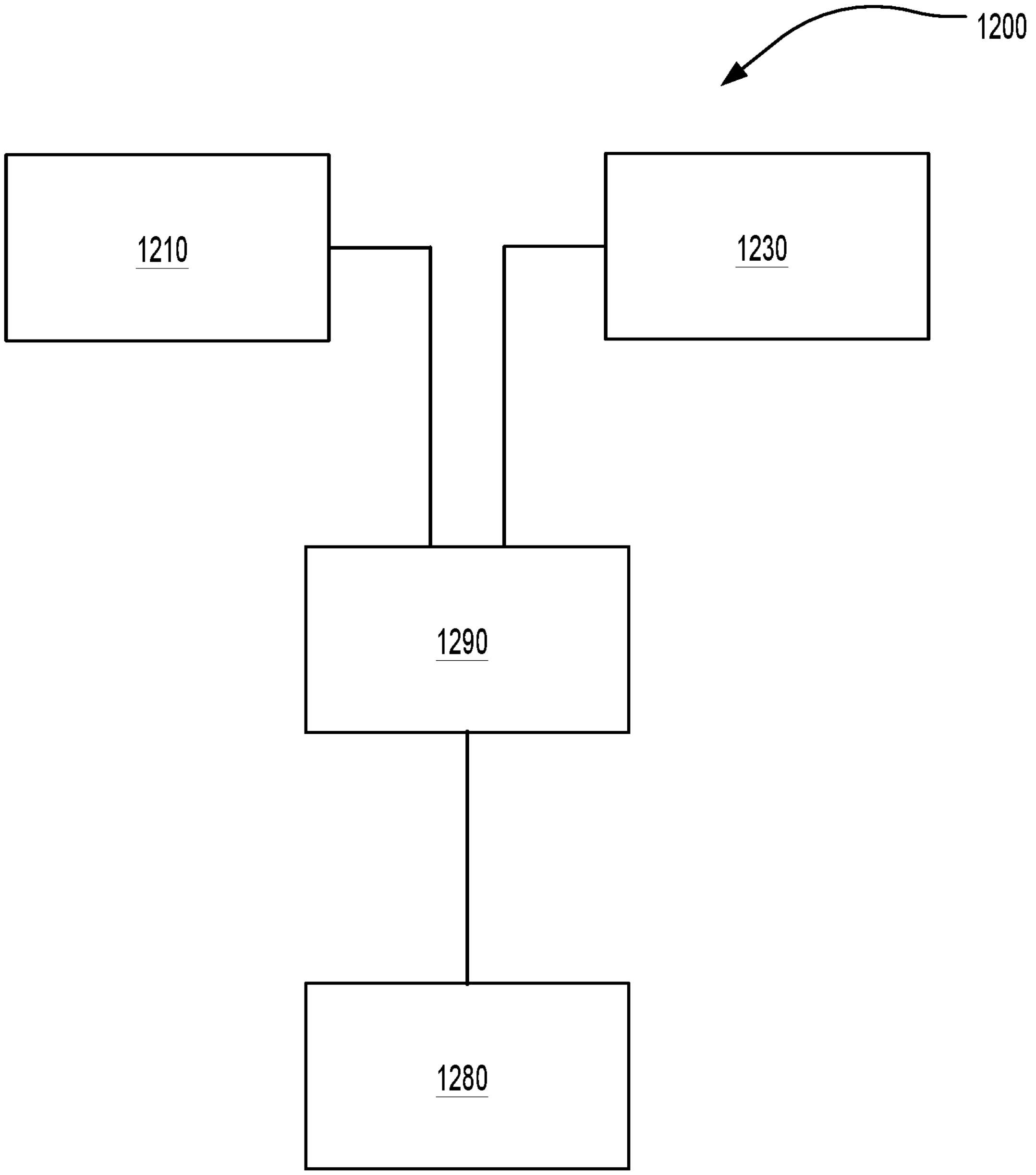
FIG. 9 schematically illustrates yet another part of the window system of FIG. 1.

Turning now to the display 1200, the display 1200 may take many different forms. It may be particularly desirable for the display 1200 to include a display panel 1210, a selectively opaque (e.g., smart glass) panel 1230, memory 1280, and a controller (or "processor") 1290, as shown in FIG. 9. Yet, in some embodiments, the display 1200 may merely include, for example, the selectively opaque panel 1230.

Figure 10:
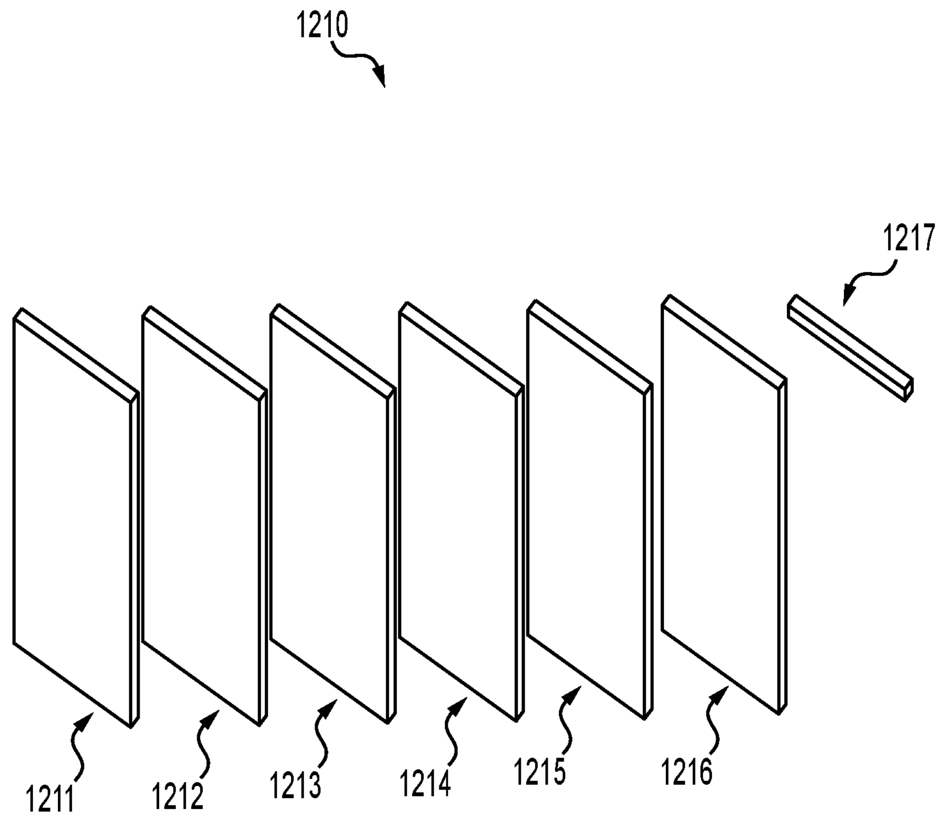
FIG. 10 is an exploded view of a display panel from the window system of FIG. 1.

The display panel 1210 may be any appropriate panel, whether now known or later developed, for displaying content. For example, the display panel 1210 may be a plasma panel, an OLED panel, an LCD panel, et cetera. The display panel 1210 illustrated in FIG. 10 is an LED LCD panel generally in accordance with those known in the art and includes, from a front (i.e., intended viewing) side, a forward polarizer 1211, a color filter glass panel 1212, liquid crystals 1213, a thin film transistor (TFT) glass panel 1214, a rear polarizer 1215, a diffuser 1216, and an LED source 1217. The polarizers 1211, 1215 may be oriented at ninety degrees to each other (e.g., the forward polarizer 1211 may be a horizontal polarizer and the rear polarizer 1215 may be a vertical polarizer), and the LED source 1217 may produce unpolarized light whose flow through the display is controlled primarily by voltage applied to the liquid crystals 1213 between the TFT glass panel 1214 and the color filter glass panel 1212. When no voltage is applied to the liquid crystals 1213, the rear polarizer 1215 polarizes the light emanating from the LED source 1217. The liquid crystals 1213 twist this polarized light to allow it to pass through the forward polarizer 1211 to the viewer. However, when voltage is applied to the molecules of the liquid crystals 1213, they begin to untwist. This movement of the molecules of the liquid crystals 1213 changes the angle of the light passing through the rear polarizer 1215 to the forward polarizer 1211. Depending on the voltage applied, at least part of the light gets blocked by the forward polarizer 1211 and makes the corresponding area of the display dark compared to other areas. The liquid crystals 1213 produce no light of their own.

For display of colored content, the LCD panel 1210 typically includes many pixels, each having three subpixels. Each subpixel includes red, green, and blue color filters, which are provided on the color filter glass panel 1212. A liquid crystal cell is associated with each of the subpixels, and is energized or de-energized via transistors of the TFT glass panel 1214 to block or transmit light. Through careful control and variation of the applied voltage, coupled with knowledge of human perception (e.g., knowledge of the human eye "rods" and "cones" along with persistence of vision), the intensity of each subpixel is manipulated so as to collectively cause the pixel to appear a particular intensity and color, including colors other than red, green, and blue (e.g., amber). Content is displayed on the LCD display 1210 by this modulation of light emanating from the LED source 1217.

The selectively opaque panel 1230 may be any appropriate panel, whether now known or later developed, for selectively prohibiting light from passing therethrough. It may be desirable for the selectively opaque panel 1230 to be a panel that changes its tint or shade upon the application of a stimulus (e.g., electric current); these panels are commonly called smart glass, privacy glass, switchable glass, intelligent glass, or electric glass. While smart glass can be made using many different types of technologies, suspended particle devices are currently the most popular type of smart glass. The present disclosure, however, encompasses smart glass manufactured using any technology, whether now known or later developed. As is described in greater detail herein, smart glass particles can be electrically excited to selectively appear transparent while becoming diffused when the excitation voltage is removed. Areas of a plane can be energized as a contiguous array of particles and controlled as a single panel of smart glass with a single AC voltage control signal excitation. Multiple areas or segments can be seamlessly isolated to create a plurality of segment array elements allowing patterns of bars, blocks, or discrete segments. A control grid or matrix of control signals can be configured as multiplexed rows and columns on opposing sides of the particle pane(s) to provide individualized control of the smart particle arrays. The multiplexed excitation control signals can be driven with strategically stepped waveform voltage levels over time in order to provide a differential signal to each particle segment area.

Figure 11A:
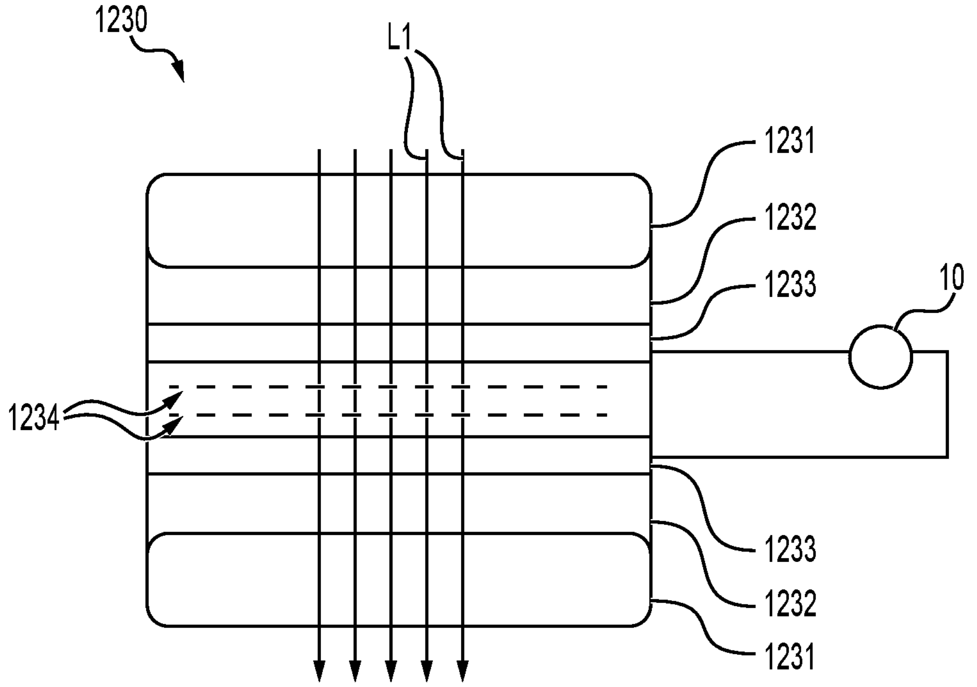
FIG. 11A schematically illustrates a selectively opaque panel from the window system of FIG. 1, in a transparent configuration.
Figure 11B:
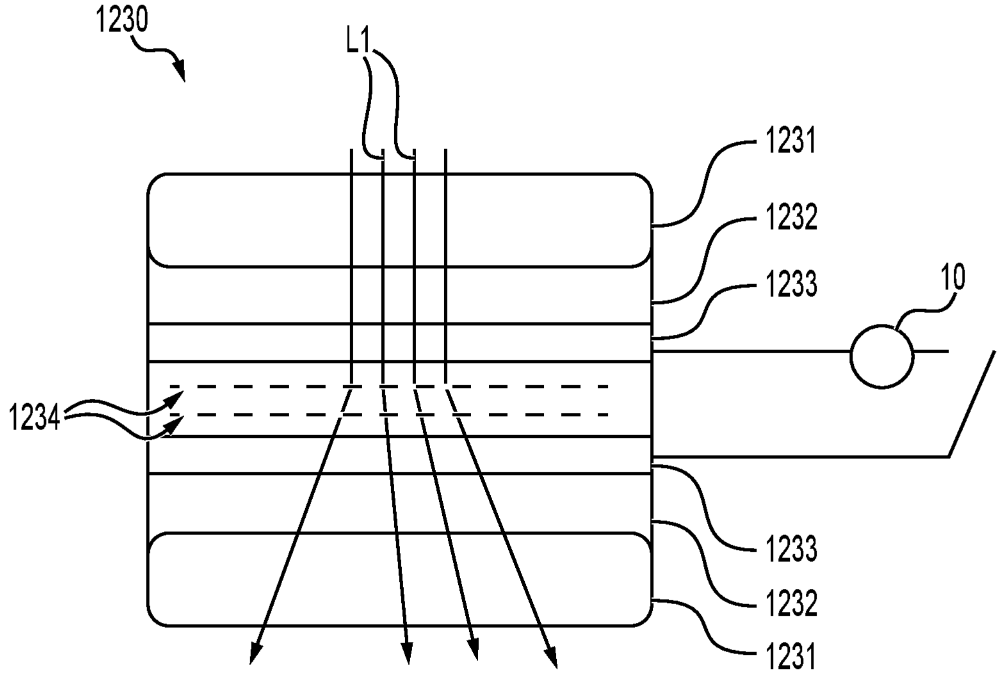
FIG. 11B schematically illustrates the selectively opaque panel of FIG. 11A, in an opaque configuration.

FIGS. 11A and 11B schematically illustrate a suspended particle smart glass panel 1230 as is known in the art. The panel 1230 may include a glass layer 1231, a polyethylene terephthalate (or PET) film 1232, and a polymer layer 1233 encasing crystalline particles (e.g., liquid crystal molecules) 1234 in a carrier fluid. When an electric current is passed through the polymer layer 1233 (as shown in FIG. 11A), the liquid crystal molecules 1234 align in a substantially uniform pattern, thereby allowing light L1 to uniformly pass therethrough (which allows the panel 1230 to be transparent or generally transparent). When the power source 10 is switched off (or otherwise disconnected, as shown in FIG. 11B), the liquid crystal molecules 1234 orient randomly and diffuse or scatter the light L1, causing the panel 1230 to become opaque (or generally opaque and not transparent). Those of skill in the art shall understand that the opposite may also be true. In other words, when the power source is switched off, the liquid crystal molecules 1234 may be aligned in a substantially uniform pattern, thereby allowing light L1 to uniformly pass therethrough. And when the power source 10 is switched on such that electric current passes through the polymer layer 1233, the liquid crystal molecules 1234 may randomly orient, to diffuse or scatter the light L1.

The display 1200 may be configured, for example, as a window in a commercial, residential, or other building as set forth in the embodiment 1000*a*; as a window in a car, airplane, or other vehicle; or as a window in a display case, refrigerator, drawer, cabinet, or other item. And additional panels may be included in the display 1200, such as one or more additional display panel, weatherproofing panel, et cetera.

The memory 1280 is in data communication with the processor 1290, and may include instructions usable by the processor 1290 to actuate the display 1200 in various manners. It may be particularly desirable for the processor 1290 to actuate the display 1200 in a display mode, an augmentation mode, a transparent mode, and a privacy mode. At the display mode, the processor 1290 causes the display panel 1210 to present content and the selectively opaque panel 1230 to be opaque. In some embodiments, only portions of the selectively opaque panel 1230 which correspond to portions of the display panel 1210 presenting content are made opaque at the display mode. At the augmentation mode, the processor 1290 causes the display panel 1210 to present content and the selectively opaque panel 1230 to be transparent, such that items beyond the display 1200 may be viewed simultaneously with the presented content. In some embodiments, only portions of the selectively opaque panel 1230 which correspond to portions of the display panel 1210 presenting content are made transparent at the augmentation mode. At the transparent mode, the processor 1290 causes the display panel 1210 to not present content and the selectively opaque panel 1230 to be transparent. And at the privacy mode, the processor 1290 causes the display panel 1210 to not present content and the selectively opaque panel 1230 to be opaque.

The memory 1280 may include volatile and non-volatile memory, and any appropriate data storage devices whether now existing or later developed may be used. Further, the memory 1280 may be a unitary memory in one location (e.g., in the window 1000*a*), or may alternately be a distributed memory such that one portion of the memory is physically separate from another portion of the non-transitory computer memory. In other words, discrete computer memory devices may be linked together (e.g., over a network) and collectively form the memory 1280. While this document shall often refer to elements in the singular, those skilled in the art will appreciate that multiple such elements may often be employed and that the use of multiple such elements which collectively perform as expressly or inherently disclosed is fully contemplated herein.

The processor 1290 may be any appropriate device, whether now existing or later developed, which actuates the operations useful for the display 1200. The processor 1290 may be electronic circuitry located on a common chip or circuit board, or may be a distributed processor such that one portion of the processor is physically separate from another portion of the processor. The processor 1290 is in data communication with the memory 1280, the display panel 1210, and the selectively opaque panel 1230.

Figure 12A:
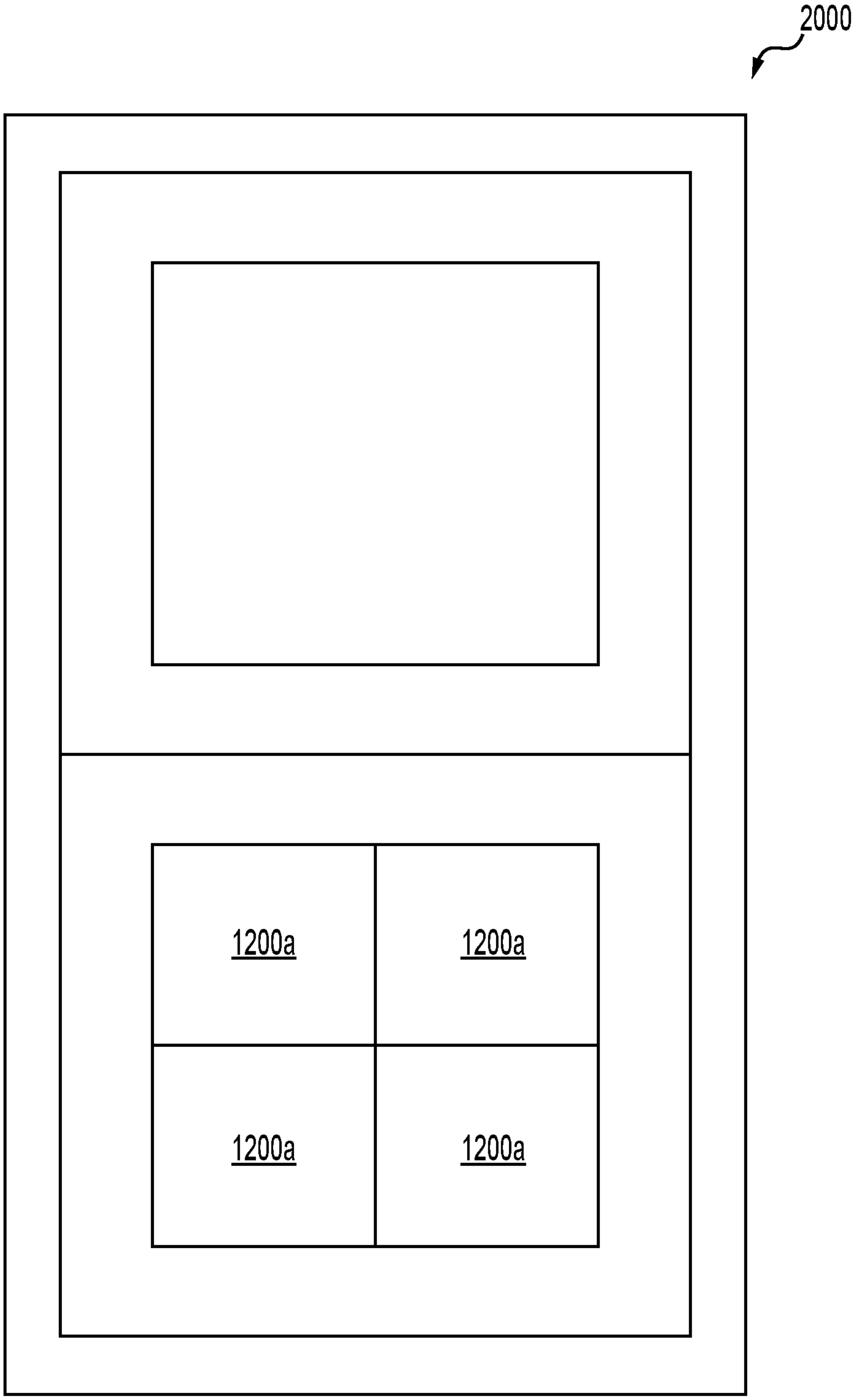
FIG. 12A is a front view of a window system according to another embodiment of the current invention.
Figure 12B:
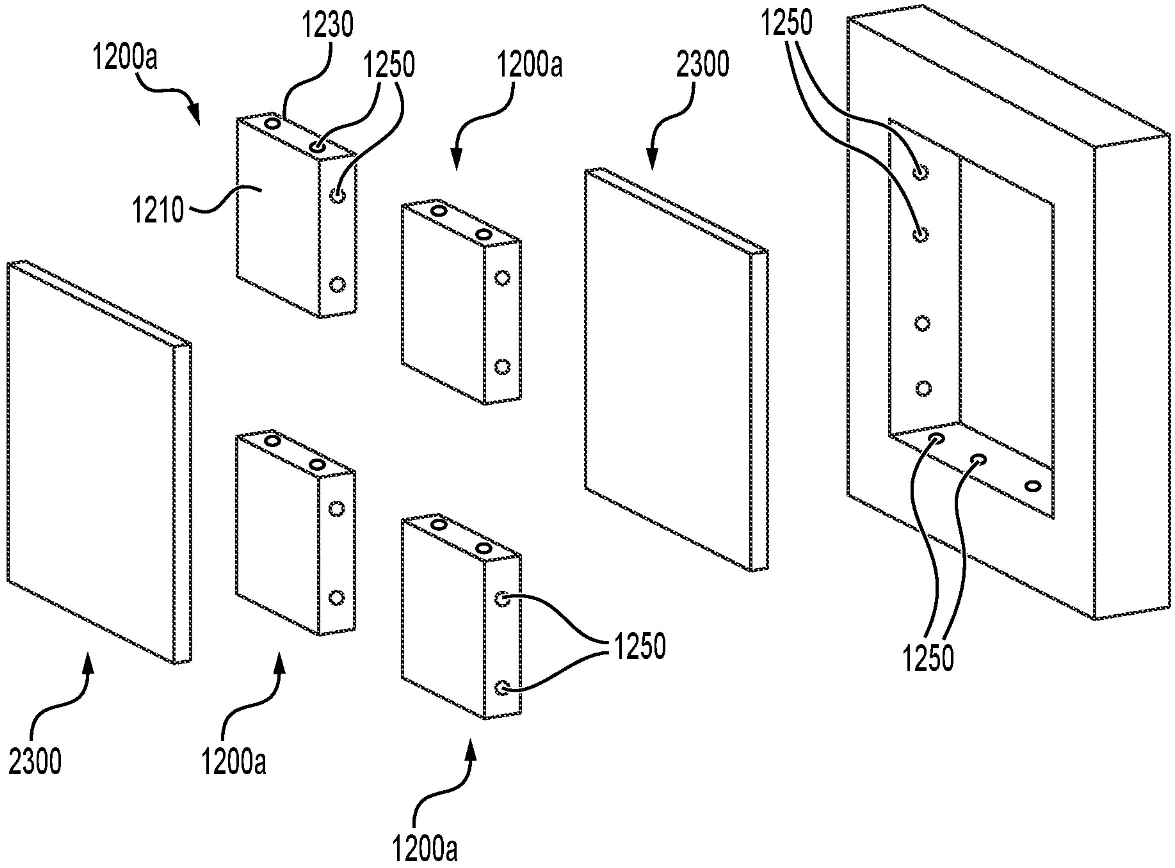
FIG. 12B is an exploded view of part of the window system of FIG. 12A.

FIGS. 12A and 12B show the display 1200 configured as a modular display 1200*a* with at least one contact 1250 for electrically interacting with another generally similar modular display 1200*a*, and collectively forming part of a window 2000 for a building. The modular displays 1200*a* may simply abut one another such that the contacts 1250 interact with one another, or channels or other locking structure may be included to ensure positioning and interaction between the contacts 1250. As with the display 1200 discussed above, the modular displays 1200*a* may each include a display panel 1210 and a selectively opaque panel 1230. The window 2000 further includes weatherproofing panels 2300 (e.g., transparent glass panes) and a sash 2350. In such modular embodiments, the processor 1290, using instructions from the memory 1280, may determine the arrangement and overall configuration of the various modular displays 1200*a* (e.g., two modular displays 1200*a* side by side, four modular displays 1200*a* arranged in two rows to form a square or rectangle, four modular displays 1200*a* above two modular displays 1200*a*, et cetera). The modular displays 1200*a* may each be the same size, or may be provided in two or more different sizes, and the processor 1290 may identify differences in size.

To automatically identify size and configuration, the processor 1290 may, for example, compare electrical resistance data from the overall configuration to known data sets. Or the processor 1290 may use input from a user through a user-involved setup process. In some embodiments, the modular displays 1200*a* each interconnect with a series of daisy-chained or networked communication bus connections. Each 1200*a* display may contain configuration identifier connection points that alert status of positioning and purpose to the adjoining 1200*a* display(s). Each individual 1200*a* display may strategically extract selected data streams of control signals, may be a ubiquitous complex composite waveform interface (e.g. HDMI, NTSC, USB, SPI, I2C, SATA, UART, OFDM, DMX512, RS-485, Ethernet, PoE, etc.) or an individualized and simplified demultiplexed version of the primary display signal(s) generated by the processor 1290 or the originated broadcast data source. In other words, each modular display 1200*a* can be physically connected, powered, and grid-connected in a series/parallel fashion to allow a simplified subset perceptive of interconnection for each modular display 1200*a*. By simplifying perspectives of data for each module, the processing power may be reduced significantly and each module can further assist in the effort of data dissemination to other modules in the array. Regardless of how the overall configuration is determined, the processor 1290 may automatically (or with user input) alter content viewable on the modular displays 1200*a*, such as by changing aspect ratio to best fit the overall configuration of the various modular displays 1200*a*, by presenting unrelated content on different displays 1200*a*, et cetera.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations.

The invention claimed is:

1. A window system, comprising:

a moveable sash having a display; and a power distribution network for providing power to the display, the power distribution network including a window sash balance forming part of an electric circuit for passing electricity from a power source to the moveable sash.

2. The window system of claim 1, wherein the display has a display panel and a selectively opaque panel.

3. The window system of claim 1, wherein:

the display includes a plurality of modular displays;

each modular display has a display panel, a selectively opaque panel, and an electrical contact; and the plurality of modular displays are sandwiched between a pair of weatherproofing panels.

4. The window system of claim 1, wherein the window sash balance is a coil balance.

5. The window system of claim 1, wherein the moveable sash comprises a solar panel.

6. The window system of claim 5, wherein the window sash balance is a coil balance.

7. The window system of claim 1, wherein the power source is selected from the group consisting of electrical wiring, a battery, and a solar panel.

8. The window system of claim 1, further comprising an energy harvesting and/or transducing device electrically coupled to the moveable sash and the power source.

9. The window system of claim 8, wherein the energy harvesting and/or transducing device passes electricity from the moveable sash to the power source.

10. The window system of claim 1, wherein the window sash balance is selected from the group consisting of a spiral balance and a helical spring.

11. The window system of claim 1, wherein the moveable sash has an energy storage module.

12. The window system of claim 1, wherein the moveable sash comprises a post and wherein the window sash balance is configured to receive the post.

13. The window system of claim 12, wherein the post is conductive and wherein electricity is passed from the power source to the moveable sash via the post.

14. A window system, comprising:

a moveable sash;

an output device communicatively coupled to the moveable sash; and a power distribution network for providing power to the output device, the power distribution network including a window sash balance forming part of an electric circuit for passing electricity from a power source to the moveable sash.

15. The window system of claim 14, wherein the output device is a display.

16. The window system of claim 15, wherein the display has a display panel and a selectively opaque panel.

17. The window system of claim 14, wherein the power source is selected from the group consisting of electrical wiring, a battery, and a solar panel.

18. The window system of claim 14, wherein the window sash balance is selected from the group consisting of a coil balance, a spiral balance, and a helical spring.

19. The window system of claim 14, wherein the moveable sash comprises a post and wherein the window sash balance is configured to receive the post.

20. The window system of claim 19, wherein the post is conductive and wherein electricity is passed from the power source to the moveable sash via the post.

* * * * *